(12) United States Patent
Madineni et al.

(10) Patent No.: US 9,886,766 B2
(45) Date of Patent: Feb. 6, 2018

(54) ELECTRONIC DEVICE AND METHOD FOR ADDING DATA TO IMAGE AND EXTRACTING ADDED DATA FROM IMAGE

(71) Applicant: Samsung Electronics Co., Ltd., Gyeonggi-do (KR)

(72) Inventors: Phani Sankar Madineni, Bangalore (IN); Sreevatsa Dwaraka Bhimidipati, Bangalore (IN)

(73) Assignee: Samsung Electronics Co., Ltd (KR)

( * ) Notice: Subject to any disclaimer, the term of this patent is extended or adjusted under 35 U.S.C. 154(b) by 414 days.

(21) Appl. No.: 14/462,067

(22) Filed: Aug. 18, 2014

(65) Prior Publication Data

US 2015/0049946 A1    Feb. 19, 2015

(30) Foreign Application Priority Data

Aug. 16, 2013 (IN) .......................... 3630/CHE/2013
Apr. 1, 2014 (KR) ........................ 10-2014-0038593

(51) Int. Cl.
| | | |
|---|---|---|
| G06K 9/34 | (2006.01) |
| G06T 7/00 | (2017.01) |
| G06T 7/11 | (2017.01) |
| G06K 9/32 | (2006.01) |
| G06T 7/194 | (2017.01) |

(52) U.S. Cl.
CPC ............. G06T 7/0081 (2013.01); G06T 7/11 (2017.01); *G06K 9/3233* (2013.01); *G06T 7/194* (2017.01)

(58) Field of Classification Search
USPC ........ 382/173, 171, 175; 1/1; 345/423, 427, 345/582; 348/333.04, 346, 466; 358/426.12, 426.13; 355/46, 53, 55; 356/512; 365/189.05, 189.16; 386/239, 386/241, 248; 375/E7.14; 714/755
See application file for complete search history.

(56) References Cited

U.S. PATENT DOCUMENTS

| | | | |
|---|---|---|---|
| 6,546,139 B1 | 4/2003 | Kondo et al. | |
| 7,978,247 B2 * | 7/2011 | Nakajima | ............... G03B 13/00 348/333.04 |
| 8,646,911 B2 * | 2/2014 | Nozato | ..................... A61B 3/14 351/205 |
| 9,070,223 B2 * | 6/2015 | Shimura | ................... G06T 5/20 |
| 9,211,063 B2 * | 12/2015 | Nozato | .................. A61B 3/107 |

\* cited by examiner

*Primary Examiner* — Anh Do
(74) *Attorney, Agent, or Firm* — The Farrell Law Firm, P.C.

(57) ABSTRACT

A method and apparatus are provided for adding data to an image and extracting the added data from the image. The method of adding the data to the image includes dividing an area of the image into a plurality of regions; identifying each of the plurality of divided regions as a focused region or a non-focused region; and adding the data in at least one of the plurality of divided regions, based on a result of the identifying.

18 Claims, 6 Drawing Sheets

ELECTRONIC DEVICE AND METHOD FOR ADDING DATA TO IMAGE AND EXTRACTING ADDED DATA FROM IMAGE

PRIORITY

This application claims priority under 35 U.S.C. §119(a) to Indian Patent Application Serial number 3630/CHE/2013, which was filed in the Indian Patent Office on Aug. 16, 2013, and to Korean Patent Application Serial number 10-2014-0038593, which was filed in the Korean Intellectual Property Office on Apr. 1, 2014, the entire content of each of which is hereby incorporated by reference.

BACKGROUND

1. Field of the Disclosure

Various embodiments of the present disclosure relate generally to an electronic device, and more particularly, to an electronic device and method for adding data to an image and extracting the added data from the image.

2. Description of the Related Art

The steganography technology is used to hide a secret message within an ordinary message and extract the secret message at the destination of the message. Steganography arguably takes cryptography a step further by hiding an encrypted message so that no one even suspects that it exists. Ideally, anyone scanning steganographic data will fail to identify it contains encrypted data.

In modern digital steganography, data may be first encrypted through usual operations and then inserted as redundant data into a specific type of file, such as an image, by using a special algorithm. In this way, data may be added to an image as redundant data in a random or non-conspicuous manner, such that the data may appear to have the "noise" patterns of regular non-encrypted data. This type of process of adding data to an image or the like may prevent intruders and other unwanted people from extracting the data added from the image because only the owner of the image is aware of the added data.

However, existing techniques that add data to an image modify the original image and often distort the image. Also, because the existing techniques modify image data when data is added to an image, these techniques create problems by modifying the original image in such a way that visual artifacts are introduced.

SUMMARY OF THE DISCLOSURE

Accordingly, the present disclosure has been designed to address at least the above-described disadvantages occurring with the existing techniques, and to provide at least the advantages described below.

An aspect of the present disclosure is to provide an electronic device and method for adding data to an image and extracting the added data from the image, while minimizing visual artifacts.

Another aspect of the present disclosure is to provide an electronic device and method for adding data to an image and extracting the added data from the image, while reducing visual data loss of an image, by adding the data in a non-focused region of the image.

In accordance with an aspect of the present disclosure, a method of adding data to an image is provided. The method includes dividing an area of the image into a plurality of regions; identifying each of the plurality of divided regions as a focused region or a non-focused region; and adding the data in at least one of the plurality of divided regions, based on a result of the identifying.

In accordance with another aspect of the present disclosure, a method of extracting data added to an image from the image is provided. The method includes dividing an area of the image into a plurality of regions; identifying each of the plurality of divided regions as a focused region or a non-focused region; and extracting the added data from at least one of the plurality of divided regions, based on a result of the identifying.

In accordance with another aspect of the present disclosure, an electronic device is provided. The electronic device includes a classification module that divides an area of the image into a plurality of regions and identifies each of the plurality of divided regions as a focused region or a non-focused region; and a data addition module that adds the data in at least one of the plurality of divided regions, based on a result of identification by the classification module.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION OF EMBODIMENTS OF THE PRESENT DISCLOSURE

Figure 1:
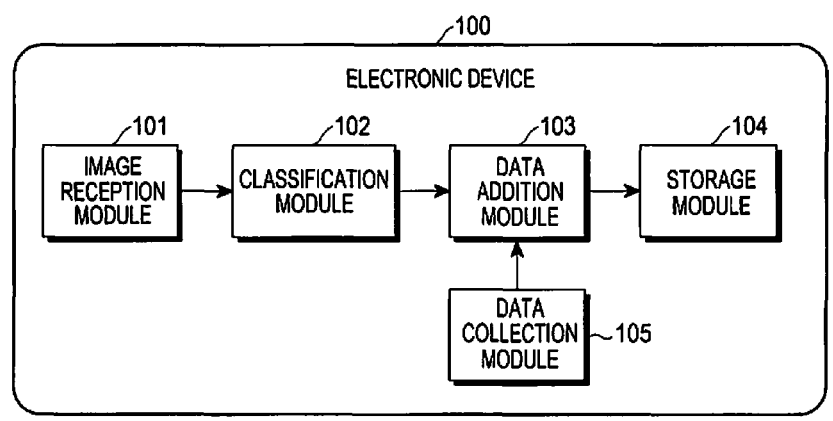
FIG. 1 is a block diagram illustrating an electronic device according to an embodiment of the present disclosure.

Various embodiments of the present disclosure will now be described more fully in conjunction with the accompanying drawings. The present disclosure may have various embodiments, and modifications and changes may be made therein. Therefore, the present disclosure will be described in detail with reference to particular embodiments shown in the accompanying drawings. However, it should be understood that there is no intent to limit various embodiments of the present disclosure to the particular embodiments disclosed, but the present disclosure should be construed to cover all modifications, equivalents, and alternatives falling within the spirit and scope of the various embodiments of disclosure.

As used in various embodiments of the present disclosure, the expressions "include", "may include" and other conjugates refer to the existence of a corresponding disclosed function, operation, or constituent element, and do not limit one or more additional functions, operations, or constituent elements. Further, as used in various embodiments of the present disclosure, the terms "include", "have" and their conjugates may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Further, as used in various embodiments of the present disclosure, the expression "or" includes any or all combinations of words enumerated together. For example, the expression "A or B" may include A, may include B, or may include both A and B.

While expressions including ordinal numbers, such as "first" and "second", as used in various embodiments of the present disclosure may modify various constituent elements, such constituent elements are not limited by the above expressions. For example, the above expressions do not limit the sequence and/or importance of the corresponding constituent elements. The above expressions may be used merely for the purpose of distinguishing a constituent element from other constituent elements. For example, a first user device and a second user device indicate different user devices although both of them are user devices. For example, a first constituent element may be referred to as a second constituent element, and likewise a second constituent element may also be referred to as a first constituent element without departing from the scope of various embodiments of the present disclosure.

When a component is referred to as being "connected" or "accessed" to or by any other component, it should be understood that the component may be directly connected or accessed by the other component, but another new component may also be interposed between them. Contrarily, when a component is referred to as being "directly connected" or "directly accessed" to or by any other component, it should be understood that there is no new component between the component and the other component.

The terms as used in various embodiments of the present disclosure are merely for the purpose of describing particular embodiments and are not intended to limit the various embodiments of the present disclosure. Singular forms are intended to include plural forms unless the context clearly indicates otherwise.

Unless defined otherwise, all terms used herein, including technical terms and scientific terms, have the same meaning as commonly understood by a person of ordinary skill in the art to which various embodiments of the present disclosure pertain. Such terms as those defined in a generally used dictionary are to be interpreted to have the meanings equal to the contextual meanings in the relevant field of art, and are not to be interpreted to have ideal or excessively formal meanings unless clearly defined in various embodiments of the present disclosure.

An electronic device according to various embodiments of the present disclosure may be an electronic device capable of processing an image. For example, the electronic device may include at least one of a smartphone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MP3 player, a mobile medical appliance, a camera, and a wearable device (e.g., a Head-Mounted-Device (HMD) such as electronic glasses, electronic clothes, an electronic bracelet, an electronic necklace, an electronic appcessory, electronic tattoos, or a smart watch).

According to some embodiments, the electronic device may be a smart home appliance. For example, the smart home appliance may include at least one of a TeleVision (TV), a Digital Video Disk (DVD) player, a stereo, a refrigerator, an air conditioner, a vacuum cleaner, an oven, a microwave oven, a washing machine, an air cleaner, a set-top box, a TV box (e.g., Samsung HomeSync®, Apple TVT®, or Google TV®), a game console, an electronic dictionary, an electronic key, a camcorder, and an electronic photo frame.

According to some embodiments, the electronic device may include at least one of various medical appliances (e.g., Magnetic Resonance Angiography (MRA), Magnetic Resonance Imaging (MRI), Computed Tomography (CT), and ultrasonic machines), navigation equipment, a Global Positioning System (GPS) receiver, an Event Data Recorder (EDR), a Flight Data Recorder (FDR), automotive infotainment device, electronic equipment for ships (e.g., ship navigation equipment and a gyrocompass), avionics, security equipment, a vehicle head unit, an industrial or home robot, an Automatic Teller Machine (ATM) of a banking system, and a Point Of Sales (POS) of a shop.

According to some embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device according to various embodiments of the present disclosure may be a combination of one or more of the aforementioned various devices. Further, the electronic device according to various embodiments of the present disclosure may be a flexible device. Further, it will be apparent to those skilled in the art that the electronic device according to various embodiments of the present disclosure is not limited to the aforementioned devices.

Hereinafter, an electronic device and method for adding data to an image and extracting the added data from the image according to various embodiments of the present disclosure will be described with reference to the accompanying drawings. Although, various embodiments of the present disclosure may be applied to a steganography method, the present disclosure is not limited thereto.

As described above, steganography may be used to embed metadata of an image in the captured image itself. In a method of adding data to an image according to an embodiment of the present disclosure, the data to be added may include the metadata, and also any data related or unrelated to the image. Also, the image to which the data is added may be an image photographed or captured by a camera module provided in an electronic device, may be an image received from a server through a network, or may be an image already stored in an electronic device.

Reference will now be made to a structure of an image to which data is added according to various embodiments of the present disclosure. It should be noted that an image to which data is added according to various embodiments of the present disclosure is not limited to the image structure as described below.

In general, an image file may be a binary file including a binary representation of color or light intensity of each picture element (pixel) of an image.

Images typically use either 8-bit or 24-bit color. When using 8-bit color, there is a definition of up to 256 colors forming a palette for the corresponding image, each of which may be denoted by an 8-bit value. A 24-bit color scheme uses 24 bits per pixel and provides a better set of colors than the 8-bit scheme. In this case, each pixel is represented by three bytes, each of which may represent the intensity of the three primary colors Red, Green, and Blue (RGB) respectively.

One example of adding data within an image file is Least Significant Bit (LBS) insertion. For example, in various embodiments of the present disclosure, the binary representation of hidden data may be taken, and the LSB of each byte within the cover image may be overwritten.

According to various embodiments of the present disclosure, when an image is captured by a camera, available metadata associated with the captured image may be generated. The metadata may be used for various purposes and also may be steganographically embedded in the corresponding image. Embedding data in this way prevents intruders and other unwanted users from identifying the data because only an owner of the image is aware that the embedding has been performed. When data is embedded into an image in order to add the data to the image, various embodiments of the present disclosure can prevent the embedding process from modifying the original image, thereby avoiding the distortion of the image.

Commonly, when image data is modified for embedding the data, the image may be modified in such a way that visual artifacts are introduced. However, various embodiments of the present disclosure minimize such visual artifacts or the modification of the image.

Various embodiments of the present disclosure include a method of adding data to an image, for example, a method of embedding metadata, which is associated with an image captured by an electronic device, in the captured image.

According to various embodiments of the present disclosure, in order to add data to an image, an entire area of the image may be divided into a plurality of regions (e.g., a plurality of blocks), each of the plurality of divided regions corresponding to a focused region or a non-focused region.

According to various embodiments of the present disclosure, data to be added may be added (e.g., embedded) in a focused region or a non-focused region, and when adding the data in a non-focused region, the modification of the image data of the original image can be minimized.

Further, according to various embodiments of the present disclosure, after the entire area of the image is divided into the plurality of regions (e.g., blocks), the plurality of divided regions may be classified into a set of regions corresponding to focused regions and a set of regions corresponding to non-focused regions. Once the plurality of divided regions are classified into a plurality of sets in this way, the data may be added in at least one set among the plurality of sets, based on focused regions.

FIG. 1 illustrates an electronic device according to an embodiment of the present disclosure.

Referring to FIG. 1, the electronic device 100 includes an image reception module 101, a classification module 102, a data addition module 103, a storage module 104, and a data collection module 105.

The image reception module 101 receives image data to which data is to be added. The image data may be image data captured by a camera module, image data received from a server, e.g., which is connected to a network, or image data stored in the storage module 104.

For example, the camera module may acquire the digital data of a scene, which is intended to be captured, through an image sensor. According to various embodiments of the present disclosure, one or more lenses in the lens section of the camera module are moved by a user or any automated mechanism to gain focus for certain objects in the scene to be captured. The amount of a focused region in the image may depend on a factor called Depth Of Field (DOF). The DOF of a camera determines objects in the scene that appear sharp in the captured image. Objects that are present in the DOF generally appear sharper and the rest of the objects outside the DOF generally appear to be blurred.

The classification module 102 classifies the image received through the image reception module 101 into a plurality of sets of blocks A and B. For example, the classification may be based on whether the blocks belong to a focused region, such that set A includes a set of blocks corresponding to non-focused regions, and set B includes a set of blocks corresponding to focused regions.

The data addition module 103 adds data (e.g., metadata) to the image, for example, embedding data (e.g., metadata) in the image. Accordingly, the data addition module 103 receives the plurality of sets of blocks from the classification module 102. A method of adding data in the blocks into which the image is classified may be implemented in various ways. For example, the data to be added may be embedded into the respective blocks by using the techniques mentioned in Steghide, which is a steganography program for hiding data in various kinds of image and audio files. However, various embodiments of the present disclosure are not limited to this method. The color-respective sample frequencies are not changed, thus making the embedding resistant against first order statistical tests.

According to an embodiment of the present disclosure, the classification module 102 divides the entire area of the image into a plurality of regions and determines if each of the plurality of divided regions corresponds to a focused region. The data addition module 103 adds the data in at least one of the plurality of divided regions, based on the result of the determination by the classification module. For example, the data addition module 103 may add the data in the set of blocks corresponding to non-focused regions, or the data addition module 103 may add the data in the set of blocks corresponding to focused regions.

Further, the embedded data may be extracted from the image by using a tool including a classification unit, which works similar to the classification module 102. The blocks provided by the classification unit of the tool have the embedded data, and the embedded data may be extracted using, for example, the techniques mentioned in the programs of Steghide.

Further, the electronic device 100 includes at least one data collection module 105. The data collection module 105 may also include at least one sensor. For example, the data collection module 105 may acquire metadata such as temperature, GPS coordinates, and time through the sensors. The metadata may be the result of a simple concatenation operation on the data acquired by the image reception module 101.

The storage module 104 stores the image with the data added thereto in a predetermined format in a memory or the like.

Figure 2:
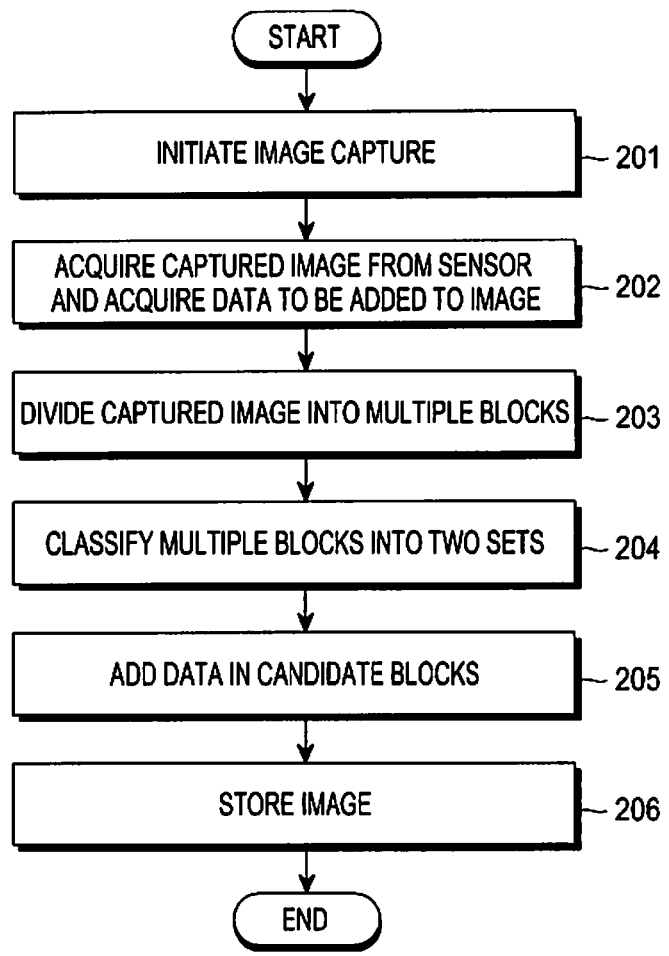
FIG. 2 is a flowchart illustrating a method of adding data to an image according to an embodiment of the present disclosure.

FIG. 2 illustrates a method of adding data to an image according to an embodiment of the present disclosure.

Referring to FIG. 2, image capture is initiated in operation 201. In operation 202, an image is acquired through the image capture and data to be added to the image is acquired.

Figure 4:
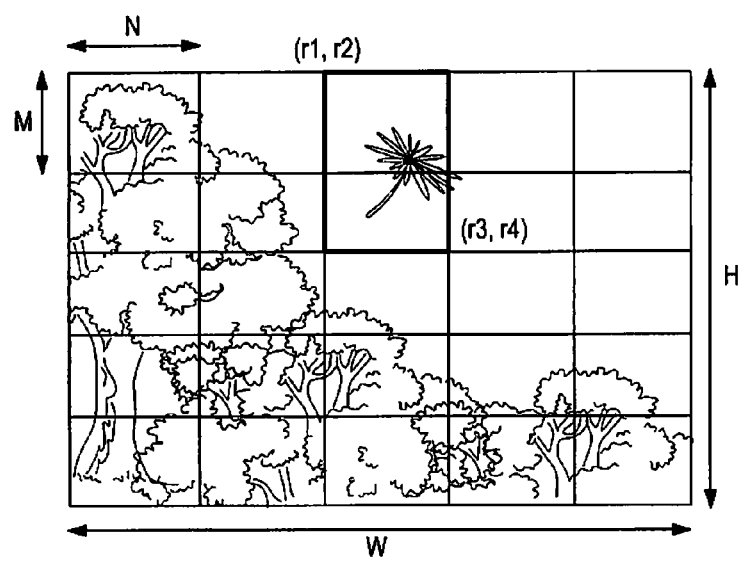
FIG. 4 illustrates block division of an image according to an embodiment of the present disclosure.

In operation 203, the captured image is divided into a plurality of blocks. For example, the entire area of the image may be equally divided into a plurality of blocks having a predetermined size, as illustrated in FIG. 4.

According to an embodiment of the present disclosure, in operation 204, the plurality of blocks are classified into two sets. As described above, the classification of the plurality of blocks may be performed based on whether each of the plurality of blocks corresponds to a focused region. In this way, the plurality of blocks may be classified into a set of blocks corresponding to focused regions and a set of blocks corresponding to non-focused regions.

In operation 205, the acquired data is added in candidate blocks among the two sets of blocks. For example, the acquired data may be added in the blocks corresponding to non-focused regions.

In operation 206, the blocks with the data added therein may be generated into image data in a predetermined format, and the generated image data is stored.

As a more particular example, when the user of an electronic device equipped with a camera wants to capture an image, the user presses the camera button in the electronic device. In response, the electronic device initiates an image capture, and may acquire a captured image from its image sensor. According to an embodiment of the present disclosure, when the image is captured, the electronic device may acquire metadata for the captured image. For example, if the image is captured at the Golden Gate Bridge, then the GPS sensor of the electronic device may acquire the GPS coordinates, and metadata information may indicate Golden Gate Bridge, San Francisco.

Further, the electronic device may classify the captured image into two sets of blocks, based on whether a plurality of blocks correspond to focused regions or non-focused regions, respectively. Focused regions in the captured image are sharper than non-focused regions. Accordingly, the electronic device may classify the captured image into two sets of blocks, based on the focused regions in the image. For example, the blocks corresponding to the focused regions form one set of blocks, and the blocks that do not fall in the focused regions, that is, the blocks corresponding to the non-focused regions, form the other set of blocks.

Thereafter, the electronic device may embed the metadata in the blocks that are in non-focused regions as candidate blocks in which the metadata may be embedded. The image with the metadata embedded therein may be stored in a predetermined format.

The various operations in FIG. 2 may be performed in the order presented in the drawing, in a different order, or simultaneously. Further, in some alternative embodiments, some of the operations illustrated in FIG. 2 may be omitted.

Figure 3:
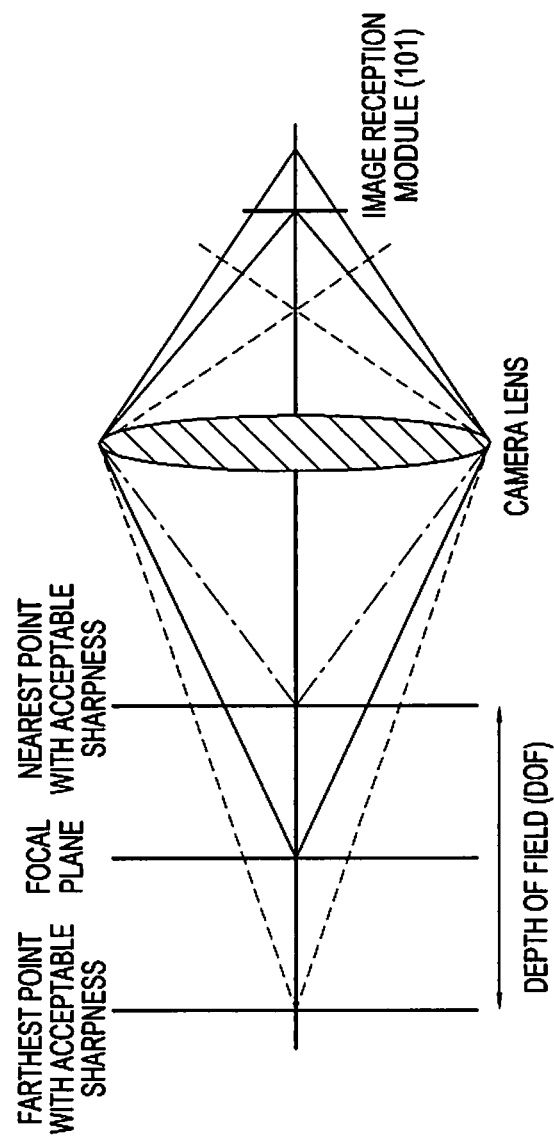
FIG. 3 is a schematic representation of a Depth Of Field (DOF) of a camera according to an embodiment of the present disclosure.

FIG. 3 illustrates a schematic representation of a DOF of a camera according to an embodiment of the present disclosure.

Referring to FIG. 3, the DOF of a camera determines objects in a scene that appear sharp in a captured image. That is, objects that are present in the DOF region appear sharp. When capturing an image, the user of the camera generates a Region Of Interest (ROI). The ROI includes desired objects in the scene that are brought into the focal plane. Additionally, objects that are present in the planes in front and beyond the focal plane also appear acceptably sharp. The blurriness of objects increases gradually as they move away from the focal plane. All focal planes where objects appear acceptably sharp determine the DOF. The process of bringing the ROI into the focal plane may be achieved manually or automatically by moving the lens of the camera. Cameras are usually equipped with auto focus algorithms that move the lens back and forth to obtain the DOF.

Because auto focus techniques are based on a sharpness function, these techniques select an image that has the maximum sharpness for a given ROI. When the auto focus algorithm successfully locks focus, it can be construed that the ROI has the maximum sharpness. In a method according to an embodiment of the present disclosure, because information in the DOF may be important in the captured image, metadata is preferably not embedded in the DOF region of the captured image.

FIG. 4 illustrates block division of an image according to an embodiment of the present disclosure.

Referring to FIG. 4, after acquiring a captured image with an ROI, as illustrated in FIG. 3, the captured image may be classified into two sets of blocks. For example, the captured image has a dimension of W*H, where W is the width of the image and H is the height of the image. As illustrated in FIG. 4, the image is divided into N*M blocks, where each block has a width of W/N and a height of H/M, and the respective blocks may be classified into two sets. The choice of M and N may depend on the size of data to be embedded, e.g., the larger the size of the data, the higher is the value of the numbers M and N.

There are various techniques for measuring sharpness of a focus in an image. Some of these techniques include a process of maximizing the high frequency in a power spectrum by using Fast Fourier Transform (FFT), variance of image grey levels, L1 norm of image gradient, L2 norm of image gradient, Laplacian, modified Laplacian, etc. Such techniques provide focus regions in an image through a sharpness function. A focused region in an image may be identified by one of these techniques, and the focused region may be represented as R ((r1, r2), (r3, r4)), where (r1, r2) and (r3, r4) denote the top-left and right-bottom coordinates respectively.

If the focused region is identified in an image, then blocks of the image are traversed. For each of the traversed blocks, the block may be mapped to either of two sets A and B. Here, set A includes blocks where metadata is embedded (candidate blocks), and set B includes blocks where the metadata is not embedded. For example, set A may be a set of blocks corresponding to non-focused regions, and set B may be a set of blocks corresponding to focused regions. For each block, it is identified whether the block is contained in the region R or has an intersection with the region R. Depending on the result of the identification, the block may be classified as belonging to either set A or set B.

Figure 5:
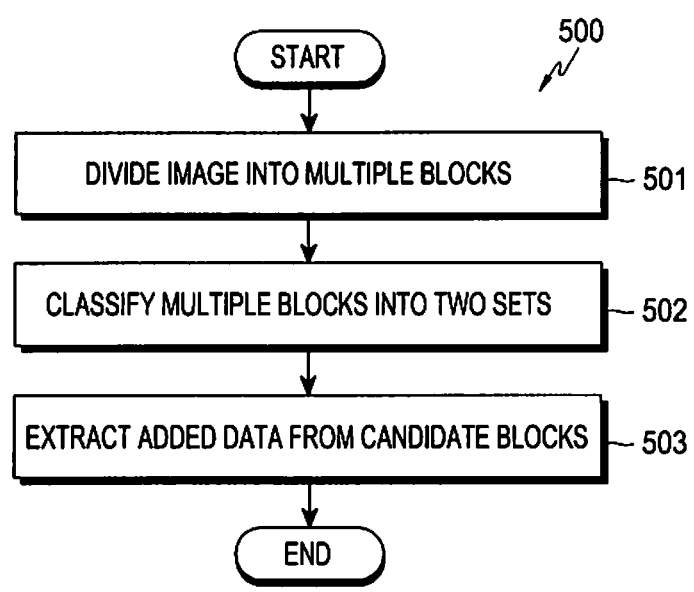
FIG. 5 is a flowchart illustrating a method of extracting data from an image according to an embodiment of the present disclosure.

FIG. 5 illustrates a method of extracting data from an image according to an embodiment of the present disclosure. Specifically, after data is added to an image, as described above, then the added data may be extracted from the image.

Referring to FIG. 5, the image is divided into a plurality of blocks in operation 501, and then the plurality of blocks are classified into two sets in operation 502.

In operation 503, the added data is extracted from candidate blocks. For example, after classifying the plurality of blocks into a set of blocks corresponding to focused regions and a set of blocks corresponding to non-focused regions, the added data may be extracted from the set of blocks corresponding to non-focused regions or from the set of blocks corresponding to focused regions.

As a more particular example, a captured image may be divided into blocks. Next, the divided blocks are classified into a set of blocks corresponding to focused regions and a set of blocks corresponding to non-focused regions. Thereafter, the blocks corresponding to non-focused regions may be determined as candidate blocks, and metadata embedded in the captured image may be extracted from the candidate blocks.

The various operations illustrated in FIG. 5 may be performed in the order presented in the drawing, in a different order, or simultaneously. Further, in some alternative embodiments, some operations illustrated in FIG. 5 may be omitted.

Figure 6:
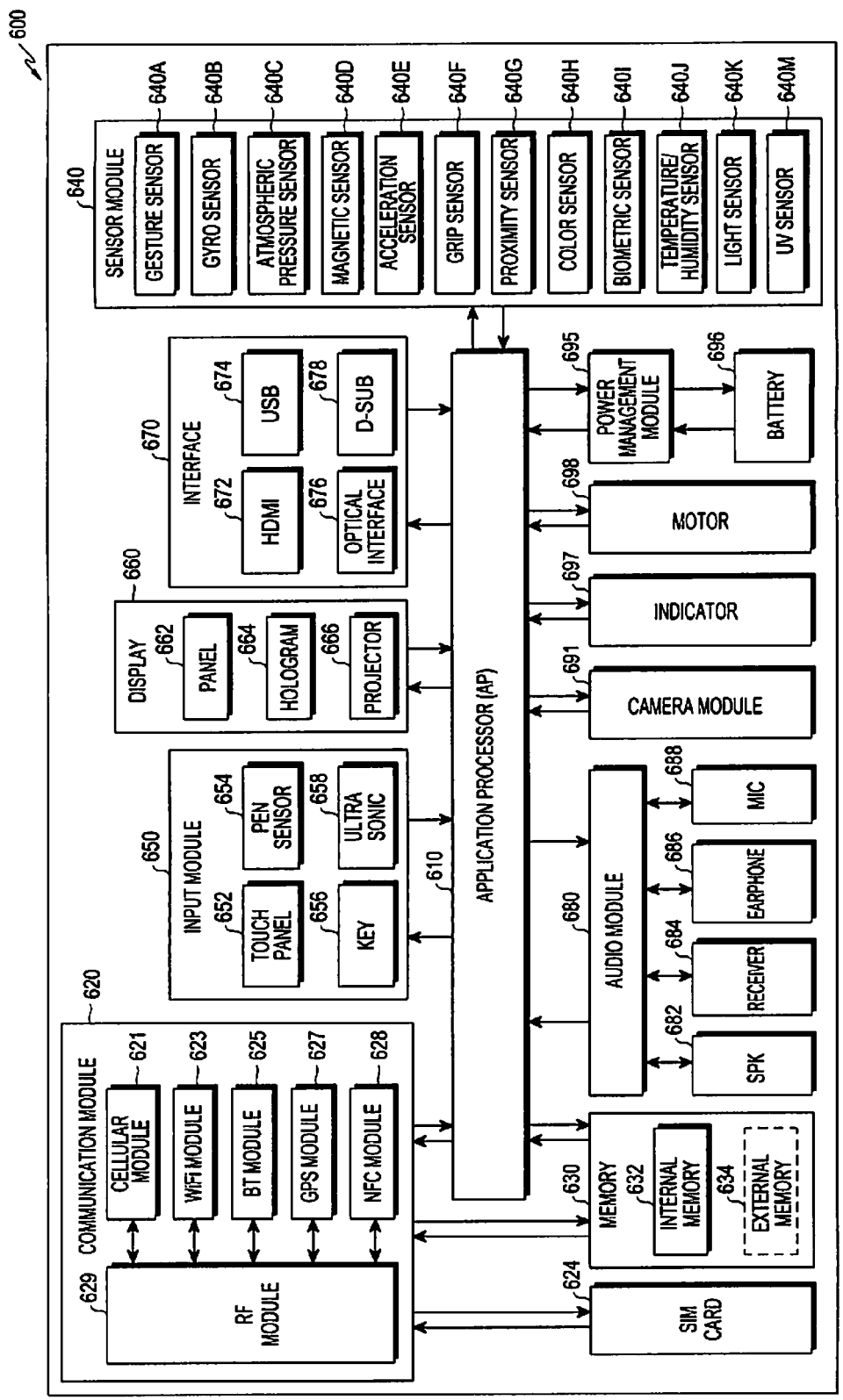
FIG. 6 is a block diagram illustrating an electronic device according to an embodiment of the present disclosure.

FIG. 6 illustrates an electronic device according to an embodiment of the present disclosure. Specifically, the electronic device 600 may constitute, for example, all or a part of the electronic device 100 illustrated in FIG. 1.

Referring to FIG. 6, the electronic device 600 includes an Application Processor (AP) 610, a communication module 620, a Subscriber Identification Module (SIM) card 624, a memory 630, a sensor module 640, an input module 650, a display 660, an interface 670, an audio module 680, a camera module 691, a power management module 695, a battery 696, an indicator 697, and a motor 698. Additionally, the electronic device 600 includes a speaker 682, a receiver 684, earphones 686, and a microphone 688.

The AP 610 may drive an operating system or an application program to control a plurality of hardware or software elements connected to the AP 610, and may execute processing and operations of various data including multimedia data. The AP 610 may be implemented as, for example, a System on Chip (SoC). According to an embodiment, the AP 610 may further include a Graphic Processing Unit (GPU) (not shown).

The communication module 620 may perform data transmission/reception in communication with other electronic devices connected through a network. The communication module 620 includes a cellular module 621, a WiFi module 623, a BT module 625, a GPS module 627, a Near Field Communication Module (NFC) module 628, and a Radio Frequency (RF) module 629. Although FIG. 6, illustrates the communication module 620 including a number of specific modules, the communication module 620 may also include modules in addition to those illustrated or fewer than those illustrated.

The cellular module 621 may provide a voice call, a video call, an Short Messaging Service (SMS) service, an Internet service, and the like through a communication network (e.g., Long Term Evolution (LTE), LTE-Advanced (LTE-A), Code Division Multiple Access (CDMA), Wideband CDMA (WCDMA), Universal Mobile Telecommunications Standard (UMTS), Wireless Broadband (WiBro), or Global System for Mobile communications (GSM)). Also, the cellular module 621 may identify and authenticate an electronic device in a communication network by using, for example, a subscriber identification module (e.g., the SIM card 624). According to an embodiment, the cellular module 621 may perform at least a part of functions that may be provided by the AP 610. For example, the cellular module 621 may perform at least a multimedia control function.

According to an embodiment, the cellular module 621 may include a Communication Processor (CP). Further, the cellular module 621 may be implemented as, for example, an SoC. Although the cellular module 621 (e.g., a CP), the memory 630, and the power management module 695 are illustrated as separate elements from the AP 610 in FIG. 6, the AP 610 may be implemented to include at least some (e.g., the cellular module 621) of the aforementioned elements.

The AP 610 or the cellular module 621 may load a command or data received from at least one of a non-volatile memory and other elements connected thereto into a volatile memory and process the loaded command. Further, the AP 610 or the cellular module 621 may store data received from or generated by at least one of other elements in a non-volatile memory.

Each of the WiFi module 623, the BT module 625, the GPS module 627, and the NFC module 628 may include a processor for processing, for example, data transmitted or received through the corresponding module. Although each of the cellular module 621, the WiFi module 623, the BT module 625, the GPS module 627, and the NFC module 628 is illustrated as a separate block in FIG. 6, at least some (e.g., two or more) of the cellular module 621, the WiFi module 623, the BT module 625, the GPS module 627, and the NFC module 628 may be included in an Integrated Chip (IC) or IC package. For example, at least some of processors corresponding to the cellular module 621, the WiFi module 623, the BT module 625, the GPS module 627, and the NFC module 628 respectively (e.g., a CP corresponding to the cellular module 621 and a WiFi processor corresponding to the WiFi module 623) may be implemented as one SoC.

The RF unit 629 may perform data transmission/reception, for example, RF signal transmission/reception. Although not illustrated in the drawing, the RF unit 629 may include, for example, a transceiver, a Power Amp Module (PAM), a frequency filter, a Low Noise Amplifier (LNA), and the like. Further, the RF unit 629 may include a component for transmitting/receiving an electromagnetic wave in the air in radio communication, such as a conductor or a conducting wire. Although FIG. 6 illustrates that the cellular module 621, the WiFi module 623, the BT module 625, the GPS module 627, and the NFC module 628 share one RF module 629, at least one of the cellular module 621, the WiFi module 623, the BT module 625, the GPS module 627, and the NFC module 628 may perform RF signal transmission/reception through a separate RF module.

The SIM card 624 may be a card including a subscriber identification module, and may be inserted into a slot formed in a certain position of the electronic device. The SIM card 624 may include unique identification information (e.g., an IC Card IDentifier (ICCID)) or subscriber information (e.g., an International Mobile Subscriber Identity (IMSI)).

The memory 630 may include an internal memory 632 or an external memory 634. The internal memory 632 may include at least one of a volatile memory (e.g., a Dynamic Random Access Memory (DRAM), a Static RAM (SRAM), or a Synchronous DRAM (SDRAM)) and a non-volatile memory (e.g., a One-Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, or a NOR flash memory).

According to an embodiment of the present disclosure, the internal memory 632 may be a Solid State Drive (SSD). The external memory 634 may include a flash drive, for example, a Compact Flash (CF), a Secure Digital (SD), a Micro SD, a Mini-SD, an extreme Digital (xD), or a Memory Stick. The external memory 634 may be functionally connected to the electronic device 600 through various interfaces. According to an embodiment, the electronic device 600 may further include a storage device (or storage medium) such as a hard drive.

The sensor module 640 may measure a physical quantity or sense an operation state of the electronic device 600 and convert the measured or sensed information into an electrical signal. The sensor module 640 includes, for example, a gesture sensor 640A, a gyro sensor 640B, an atmospheric pressure sensor 640C, a magnetic sensor 640D, an acceleration sensor 640E, a grip sensor 640F, a proximity sensor 640G, a color sensor 640H (e.g., an RGB sensor), a biometric sensor 640I, a temperature/humidity sensor 640J, a light sensor 640K, and an UltraViolet (UV) sensor 640M. Although FIG. 6, illustrates the sensor module 640 including a number of specific sensors, the sensor module 640 may also include sensors in addition to those illustrated or fewer than those illustrated.

For example, the sensor module 640 may additionally or alternatively include an E-nose sensor, an ElectroMyoGraphy (EMG) sensor, an ElectroEncephaloGram (EEG) sensor, an ElectroCardioGram (ECG) sensor, an InfraRed (IR) sensor, an iris scanner, a fingerprint sensor, etc. The sensor module 640 may further include a control circuit for controlling one or more sensors included therein.

The input module 650 includes a touch panel 652, a (digital) pen sensor 654, a key 656, and an ultrasonic input unit 658. For example, the touch panel 652 for recognizing a touch input may include at least one of a capacitive touch panel, a resistive touch panel, an infrared touch panel, and an acoustic wave touch panel. Further, the touch panel 652 may further include a control circuit. When the touch panel is a capacitive touch panel, it may recognize a physical contact or proximity. The touch panel 652 may also further include a tactile layer. In this case, the touch panel 652 may provide a tactile response to a user.

The (digital) pen sensor 654 may be implemented, for example, using a device identical or similar to a device for receiving a touch input from a user or using a separate recognition sheet.

The key 656 may include, for example, a physical button, an optical key, or a keypad.

The ultrasonic input unit 658 can identify data by generating an ultrasonic signal through an input tool (e.g., pen) and detecting a sonic wave through a microphone (e.g., microphone 688) in the electronic device 600, and is capable of wireless recognition.

Although FIG. 6, illustrates the input module 650 including a number of specific input devices, the input module 650 may also include devices in addition to those illustrated or fewer than those illustrated.

According to an embodiment, the electronic device 600 may also receive a user input from an external device (e.g., computer or server) connected thereto by using the communication module 620.

The display 660 includes a panel 662, a hologram unit 664, or a projector 666. For example, the panel 662 may be a Liquid Crystal Display (LCD) or an Active Matrix-Organic Light Emitting Diode (AM-OLED). The panel 662 may be implemented to be, for example, flexible, transparent, or wearable. The panel 662 may also be incorporated into one module together with the touch panel 652.

The hologram unit 664 may show a three-dimensional image in the air by using light interference.

The projector 666 may display an image by projecting light onto a screen. The screen may be located, for example, inside or outside of the electronic device 600.

According to an embodiment, the display 660 may further include a control circuit for controlling the panel 662, the hologram unit 664, or the projector 666.

Although FIG. 6, illustrates the display 660 including a number of specific display devices, the display 660 may also include display devices in addition to those illustrated or fewer than those illustrated.

The interface 670 includes a High-Definition Multimedia Interface (HDMI) 672, a Universal Serial Bus (USB) 674, an optical interface 676, or a D-subminiature (D-sub) 678.

Although FIG. 6, illustrates the interface 670 including a number of specific interfaces, the interface 670 may also include interfaces in addition to those illustrated or fewer than those illustrated. For example, the interface 670 may additionally or alternatively include a Mobile High-definition Link (MHL) interface, an SD card/MultiMedia Card (MMC) interface, or an Infrared Data Association (IrDA) interface.

The audio module 680 may provide bidirectional conversion between sound and electrical signals. The audio module 680 may process sound information input or output through, for example, the speaker 682, the receiver 684, the earphones 686, or the microphone 688.

The camera module 691 is a device that can take still and moving images, and according to an embodiment, may include one or more image sensors (e.g., a front sensor or a rear sensor, not illustrated), a lens (not illustrated), an Image Signal Processor (ISP) (not illustrated), and/or a flash (e.g., an LED or a xenon lamp, not illustrated).

The power management module 695 may manage power of the electronic device 600. Although not illustrated in the drawing, the power management module 695 may include, for example, a Power Management IC (PMIC), a charger IC, or a battery or fuel gauge.

The PMIC may be mounted in, for example, an IC or SoC semiconductor. Charging methods may be classified into wired charging and wireless charging. The charger IC may charge a battery, and may prevent an overvoltage or excess current from being induced or flowing from a charger. According to an embodiment, the charger IC may include a charger IC for at least one of the wired charging and the wireless charging. Examples of the wireless charging include magnetic resonance charging, magnetic induction charging, and electromagnetic charging, and additional circuits such as a coil loop, a resonance circuit, and a rectifier may be added for the wireless charging.

The battery gauge may measure, for example, the residual capacity, charge in voltage, current, or temperature of the battery 696. The battery 696 may store or generate electricity, and may supply power to the electronic device 600 by using the stored or generated electricity. The battery 696 may include, for example, a rechargeable battery or a solar battery.

The indicator 697 may display a specific state of the electronic device 600 or a part thereof (e.g., the AP 610), for example, a boot-up state, a message state, or a charging state. The motor 698 may convert an electrical signal into a mechanical vibration.

Although not illustrated, the electronic device 600 may include a processing unit (e.g., GPU) for supporting a mobile TV function. The processing unit for supporting a mobile TV function may process media data pursuant to a certain standard such as Digital Multimedia Broadcasting (DMB), Digital Video Broadcasting (DVB), or media flow.

Each of the above described elements of the electronic device, according to various embodiments of the present disclosure, may be formed of one or more components, and the name of a corresponding element may vary according to the type of an electronic device. The electronic device according to various embodiments of the present disclosure may include at least one of the above described elements, and may exclude some of the elements or further include other additional elements. Further, some of the elements of the electronic device according to various embodiments of the present disclosure may be coupled to form a single entity while performing the same functions as those of the corresponding elements before the coupling.

The term "module" as used in various embodiments of the present disclosure may mean, for example, a unit including one of hardware, software, and firmware or any combination of two or more of them. The "module" may be interchangeably used with, for example, the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to various embodiments of the present disclosure may include at least one of an Application-Specific IC (ASIC) chip, a Field-Programmable Fate Array (FPGA), and a programmable-logic device for performing certain operations, which are now known or will be developed in the future.

At least some of the devices (e.g., modules or functions thereof) or methods (e.g., operations) according to various embodiments of the present disclosure may be implemented by, for example, by a command stored in a computer-readable storage medium in the form of a programming module. The command, when executed by at least one processor (e.g., the AP 610), enables the at least one processor to perform a function corresponding to the command. The computer-readable storage medium may be, for example, the memory 630. At least a part of the programming module may be implemented (e.g., executed) by, for example, the AP 610. At least a part of the programming module may include, for example, a module, a program, a routine, a set of instructions, or a process for performing at least one function.

The computer readable recording medium may include magnetic media such as a hard disc, a floppy disc, and a magnetic tape, optical media such as a Compact Disc ROM (CD-ROM) and a DVD, magneto-optical media such as a floptical disk, and hardware devices specifically configured to store and execute program commands, such as a ROM, a RAM, and a flash memory. Further, the program commands may include high class language codes that can be executed in a computer by using an interpreter, as well as machine language codes that are made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some of the operations may be executed in a different order, some of the operations may be omitted, or other operations may be added.

According to various embodiments of the present disclosure, commands stored in a storage medium, when executed by at least one processor, cause the at least one processor to perform at least one operation, which may include an operation of receiving a biosignal (e.g., pulse wave signal) in an electronic device (e.g., the electronic device 101), an operation of checking if the user of the electronic device wears the electronic device, based on at least the biosignal, and an operation of independently controlling (e.g., turning on/off) a plurality of Input/Output (IO) units (e.g., a display, a speaker, and a microphone) functionally connected to the electronic device respectively, based on whether the user wear the electronic device or not.

Various embodiments of the present disclosure disclosed in this specification and the drawings are merely specific examples presented in order to easily describe technical details of the present disclosure and to help the understanding of the present disclosure, and are not intended to limit the scope of the present disclosure. Therefore, it should be construed that, in addition to the embodiments disclosed herein, all modifications and changes or modified and changed forms derived from the technical idea of various embodiments of the present disclosure fall within the scope of the present disclosure.

What is claimed is:

1. A method of operating an electronic device including a processor for adding data to an image, the method comprising:
   dividing, by the processor, an area of the image into a plurality of regions;
   identifying, by the processor, each of the plurality of divided regions as a focused region or a non-focused region; and
   generating, by the processor, an image including the data by adding the data in at least one of the plurality of divided regions, based on a result of the identifying,
   wherein the image which includes the added data has a predetermined image format.

2. The method of claim 1, further comprising classifying the plurality of identified regions into a set of focused regions and a set of non-focused regions,
   wherein adding the data in the at least one of the plurality of divided regions comprises adding the data in the set of the non-focused regions.

3. The method of claim 1, further comprising classifying the plurality of identified regions into a set of focused regions and a set of non-focused regions,
   wherein adding the data in the at least one of the plurality of divided regions comprises adding the data in the set of the focused regions.

4. The method of claim 1, further comprising storing the image with the data added thereto in the predetermined image format.

5. A method of operating an electronic device including a processor for extracting data added to an image from the image, the method comprising:
   obtaining, by the processor, the image including the data by adding the data in the image;
   dividing, by the processor, an area of the image into a plurality of regions;
   identifying, by the processor, each of the plurality of divided regions as a focused region or a non-focused region; and
   extracting, by the processor, the added data from at least one of the plurality of divided regions, based on a result of the identifying,
   wherein the image which includes the added data has a predetermined image format.

6. The method of claim 5, further comprising classifying the plurality of identified regions into a set of focused regions and a set of non-focused regions,
   wherein extracting the added data from the at least one of the plurality of divided regions comprises extracting the added data from the set of the non-focused regions.

7. The method of claim 5, further comprising classifying the plurality of identified regions into a set of focused regions and a set of non-focused regions,
   wherein extracting the added data from the at least one of the plurality of divided regions comprises extracting the added data from the set of the focused regions.

8. An electronic device for adding data to an image, the electronic device comprising:
   a memory; and a processor configured to:
divide an area of the image into a plurality of regions and identify each of the plurality of divided regions as a focused region or a non-focused region; and
generate an image including the data by adding the data in at least one of the plurality of divided regions, based on a result of the identification,
wherein the image which includes the added data has a predetermined image format.

9. The electronic device of claim 8, wherein the processor is further configured to classify the plurality of identified regions into a set of focused regions and a set of non-focused regions, and add the data in the set of the non-focused regions.

10. The electronic device of claim 8, wherein the processor is further configured to classify the plurality of identified regions into a set of focused regions and a set of non-focused regions, and add the data in the set of the focused regions.

11. The electronic device of claim 8, wherein the memory is configured to store the image with the data added thereto in the predetermined image format.

12. A non-transitory computer readable recording medium recording a program to be executed on a computer, the program including a command for, when executed by a processor, causing the processor to perform operations of:
dividing an area of an image into a plurality of regions;
identifying each of the plurality of divided regions as a focused region or a non-focused region; and
generating an image including data by adding the data in at least one of the plurality of divided regions, based on a result of the identifying,
wherein the image which includes the added data has a predetermined image format.

13. The non-transitory computer readable recording medium of claim 12, wherein the command causes the processor to further perform an operation of classifying the plurality of identified regions into a set of focused regions and a set of non-focused regions,
wherein adding data in the at least one of the plurality of divided regions comprises adding the data in the set of the non-focused regions.

14. The non-transitory computer readable recording medium of claim 12, wherein the command causes the processor to further perform an operations of classifying the plurality of identified regions into a set of focused regions and a set of non-focused regions,
adding data in the at least one of the plurality of divided regions comprises adding the data in the set of the focused regions.

15. The non-transitory computer readable recording medium of claim 12, wherein the command causes the processor to further perform an operation of storing the image with the data added thereto in the predetermined image format.

16. A non-transitory computer readable recording medium recording a program to be executed on a computer, the program including a command for, when executed by a processor, causing the processor to perform operations of:
obtaining, by the processor, the image including data by adding the data in the image;
dividing an area of the image into a plurality of regions;
identifying each of the plurality of divided regions as a focused region or a non-focused region; and
extracting data added to the image from at least one of the plurality of divided regions, based on a result of the identifying,
wherein the image which includes the added data has a predetermined image format.

17. The non-transitory computer readable recording medium of claim 16, wherein the command causes the processor to further perform an operation of classifying the plurality of identified regions into a set of focused regions and a set of non-focused regions,
wherein extracting data added to the image from at least one of the plurality of divided regions comprises extracting the added data from the set of the non-focused regions.

18. The non-transitory computer readable recording medium of claim 16, wherein the command causes the processor to further perform an operation of classifying the plurality of identified regions into a set of focused regions and a set of non-focused regions,
wherein extracting data added to the image from at least one of the plurality of divided regions comprises extracting the added data from the set of the focused regions.

* * * * *

UNITED STATES PATENT AND TRADEMARK OFFICE
CERTIFICATE OF CORRECTION

PATENT NO. : 9,886,766 B2  
APPLICATION NO. : 14/462067  
DATED : February 6, 2018  
INVENTOR(S) : Phani Sankar Madineni et al.

Page 1 of 1

It is certified that error appears in the above-identified patent and that said Letters Patent is hereby corrected as shown below:

On the Title Page

(72) Inventors:  
"Sreevatsa Dwaraka Bhimidipati"  
Should read:  
-- Sreevatsa Dwaraka Bhamidipati --

Signed and Sealed this  
Twenty-fifth Day of September, 2018

Andrei Iancu  
*Director of the United States Patent and Trademark Office*